Nov. 14, 1967  C. GOEBEL  3,352,158

PRESSURE GAUGE FOR PUMPS

Filed Dec. 2, 1965

INVENTOR.
Clarence Goebel

United States Patent Office 3,352,158
Patented Nov. 14, 1967

3,352,158
PRESSURE GAUGE FOR PUMPS
Clarence Goebel, Rte. 2, Hermleigh, Tex. 79526
Filed Dec. 2, 1965, Ser. No. 511,201
4 Claims. (Cl. 73—420)

ABSTRACT OF THE DISCLOSURE

A pressure gauge is attached to a T-shaped pipe coupling to which the rubber hose from a pump is attached. A ring clamp attaches the pipe coupling to a pump barrel.

---

This invention relates to measuring and gauging devices, and more particularly to a pressure gauge for pumps.

It is therefore the main purpose of this invention to provide a pressure gauge for pumps which can be easily clamped or removed from the pump without having to disturb the operation of the pump.

Another object of this invention is to provide a pressure gauge for pumps wherein the gauging device is provided with a threaded portion for screwing said device into the pump assembly.

Another object of this invention is to provide a pressure gauge for pumps wherein the gauging device is additionally supported by clamp means to prevent distorted readings on the gauging device due to vibrations of the pump when in operation.

Still another object of this invention is to provide a pressure gauge for pumps which is easy to manufacture and provides maximum utility to its user.

Other objects and advantages of this invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figure 1:
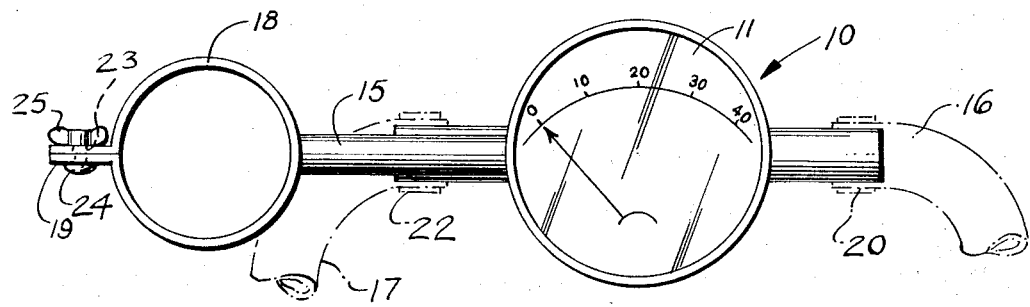
FIGURE 1 is a plan view of this invention.
Figure 2:
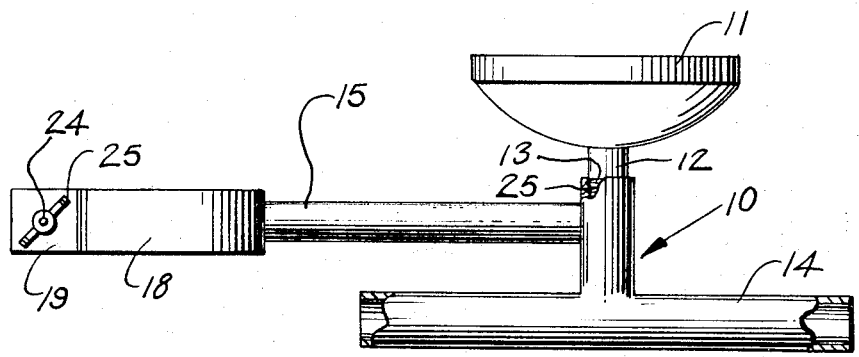
FIGURE 2 is a side elevational view of FIGURE 1.

According to this invention, pressure gauge 10 is provided with a sensitive air pressure gauging device 11 which is provided with a stem 12 suitably attached to the rear portion of gauging device 11 and being provided with a threaded portion 13. An inverted T-shaped pipe coupling 14 being provided with threaded portion 25 within its lateral extension for admitting the threaded portions 13 of stem 12. The longitudinal ends of pipe coupling 14 being adapted for insertion into the openings of pump hose 17 and 16. Hose clamps 20 and 22 are superimposed on the end portions of hose 16 and 17 for firmly securing the longitudinal ends of pipe coupling 14 to hose 16 and 17. An elongated clamp 15 is secured to the lateral portion of pipe coupling 14 by any suitable means, such as, welding. The other end of clamp 15 includes an expandable ring 18 suitably secured to clamp 15. Circular ring is provided with outwardly extending ends 19 having concentric for admitting bolt 24 in cooperation with nut 25.

Looking now at FIGURE 1 of the drawing, one will see that pump barrel (not shown) may be positioned through the opening of circular ring 18 which secures the pressure gauge 10 to pump barrel by tightening wing nut 25. Additional steadiness of pressure gauge is provided by clamps 20 and 22 which enclose and secure hose 16 and 17 to the longitudinal ends of pipe coupling 14.

It will also be noted that air pressure gauging device 11 can be removed during the installation of clamp 15 and pipe coupling 14 on a pump (not shown) or a gauging device showing different air pressure may be substituted for the original gauging device.

What I now claim is:

1. Pressure gauge for pump comprising an air pressure gauging device, a pipe coupling including a lateral extension and longitudinal extensions perpendicular to said lateral extension, said gauging device removably secured to said lateral extension of said coupling, a pump hose removably secured to said longitudinal extension of said coupling, a clamp including a horizontal, elongated stem projecting from said lateral extension, a flexible, circular ring secured to said stem and having a pair of ends extending therefrom for admitting a pump barrel into said ring, means for securing said pump barrel within said ring thus firmly securing said gauging device to the pump.

2. Pressure gauge according to claim 1, wherein said air pressure gauging device is provided with a stem having a threaded portion thereon mating with corresponding threads in the end of said lateral extensions for securing said air pressure gauging device within said pipe coupling.

3. Pressure gauge according to claim 1, wherein a metallic clamp is provided for each end of said pump hose, said clamp being adapted to removably secure a longitudinal extension of said coupling within the end portion of said hose.

4. Pressure gauge according to claim 1, wherein said ends of said circular ring are provided with holes, a bolt adapted to be positioned within said holes, a wing nut capable of securing said bolt within said holes and varying the diameter of said circular ring in accordance with the thickness of said pump barrel.

References Cited

UNITED STATES PATENTS

| | | | |
|---|---|---|---|
| 2,238,958 | 4/1941 | Wells | 73—420 |
| 3,320,801 | 5/1967 | Rhindress | 73—116 |

DAVID SCHONBERG, *Primary Examiner.*

LOUIS PRINCE, *Examiner.*

D. E. CORR, *Assistant Examiner.*